Jan. 8, 1957    P. SHAFFER    2,776,811
ADJUSTABLE POST
Filed Sept. 2, 1953
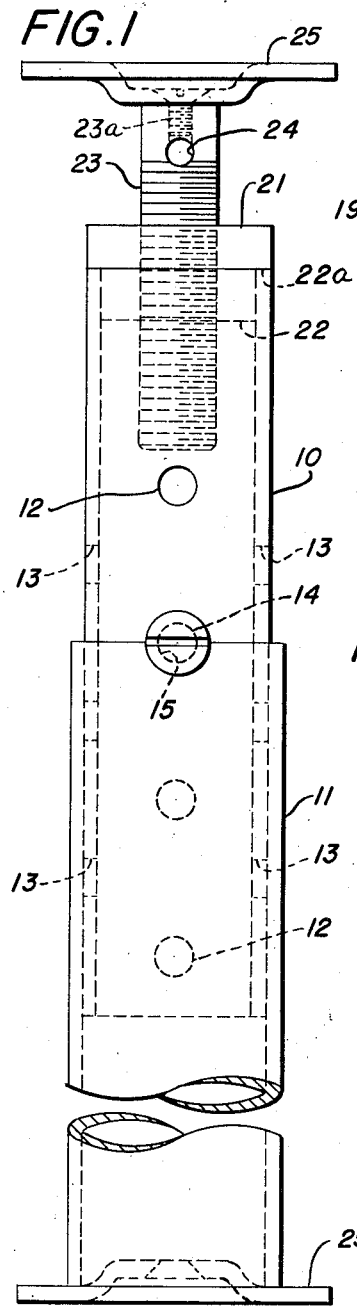
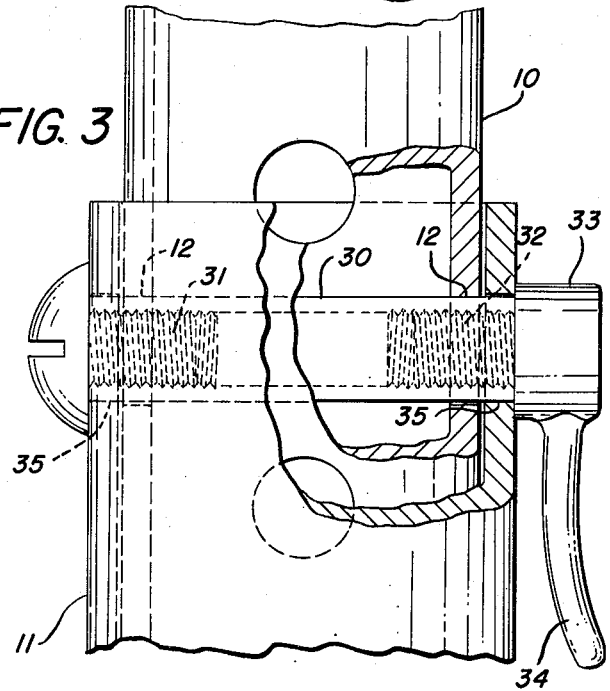
INVENTOR.
PAUL SHAFFER
BY William Cleland
ATTORNEY United States Patent Office 2,776,811
Patented Jan. 8, 1957

2,776,811

ADJUSTABLE POST

Paul Shaffer, Akron, Ohio

Application September 2, 1953, Serial No. 378,011

3 Claims. (Cl. 248—354)

This invention relates to adjustable posts of the type including a screw-operated lifting jack and particularly useful for supporting or leveling sagging floors.

Heretofore, adjustable posts in common use have included two telescoping pipes retained in longitudinal adjustment by means of a load-supporting locking pin inserted through the two pipes. Pins now in use have been objectionable either because of a danger of accidental removal of the same, causing collapse of the post, or because reduced or recessed retaining portions seriously reduced the shearing strength of the same.

One object of the invention is to provide an adjustable post of the character described having a load-supporting locking pin which is provided with improved safety means for preventing accidental removal of the pin.

Another object of the invention is to provide an adjustable post of the character described in which said safety means includes at least one removable threaded part in a hollow load-receiving end of the pin, whereby the load stresses are effective to distort said end of the pin and bind the threaded connections therein and thereby prevent manual removal of the threaded part.

Another object of the invention is to provide a post having a load-supporting locking pin for the purposes described, including a hollow or tubular part which will support a load equivalent to that which could be supported by said part if the same were solid instead of tubular.

These and other objects of the invention will be manifest from the following brief description and the accompanying drawings.

Of the accompanying drawings:

Figure 1 is a front elevation, partly broken away, of an adjustable post assembly embodying the features of the invention.

Figure 2 is an enlarged fragmentary side elevation, partly broken away and in section, of the supporting connection between the telescoping members, as viewed from the right of Figure 1.

Figure 3 is a fragmentary side elevation similar to Figure 2, partly broken away and in section, of a modified form of telescopic post embodying the features of the invention.

Referring particularly to Figures 1 and 2, the numeral 11 designates an elongated, normally vertically extending, tubular member or pipe, within which is telescopically received a similar tubular element or pipe 10 to extend from an upper end of the member in various positions of longitudinal adjustment. For supporting the tubular element 10 in selected positions of longitudinal adjustment with respect to the tubular member 11, vertically spaced, circumferentially staggered pairs of aligned apertures 12, 12 and 13, 13 are provided in diametrically opposite wall portions of said element, adapted to receive a steel load-supporting pin 14 therethrough to have opposite ends of the pin supported in aligned recesses or notches 15, 15 in the upper end of member 11. The pin 14 may be tubular, as shown in Figure 2, and internally threaded at both ends as indicated by the numerals 16, 16, coaxially to receive screws 17, 17. The length of the hollow pin approximates the outer diameter of member 11, so that when the screws 17 are fully threaded into the ends of the pin enlarged heads 18, 18 on the screws will present flat seat portions 18a inwardly in abutment with the outer periphery of member 11, to prevent accidental removal or displacement of the pin. Moreover, the screws extend inwardly beyond the inner periphery of element 10 and thereby provide solid supporting ends having the same effective shearing strength as would a pin which is solid throughout its length. This feature utilized in a hollow pin results in substantial saving in material. Screw driver slots 19, 19 are provided in the rounded heads 18 for turning the screws in the threaded ends 16 of the pin.

Screw means is provided for powerful, relatively more accurate longitudinal adjustment of the post. Accordingly, a nut 21 has a reduced portion 22 for tight reception in the outer or upper end of tubular element 10 to define an annular shoulder portion 22a seating against the outer or upper rim portion of element 10, and a screw shaft 23 threaded through the nut has a bore 24 in the same adjacent its outer end to receive a turning bar (not shown) for turning the screw shaft in the nut.

Interchangeable end plates 25, 25 may be removably and self-centeringly provided on the upper end of screw shaft 23 and on the lower end of member 11, substantially as shown in Figure 1. The top plate of Figure 1 is shown secured to the corresponding end of shaft 23 by means of a countersunk-head screw 23a.

In operation or use of the improved post, as for leveling and supporting the floor of a building, the post is first adjusted to approximate length less than the distance between a supporting bottom surface and an overhead joist or beam of the floor to be supported (not shown), and then the pin 14, with at least one screw member 17 removed is inserted through a pair of aligned apertures 12, 12 (or 13, 13), after which the element 10 is moved inwardly of the member 11 to guide projecting ends of the pin into the aligned recesses 15 at the upper end of the member. When this is done both screws 17, then received in the ends of the pin, may be tightened until the heads 18 engage the outer periphery of member 11 at diametrically opposite sides thereof. The heads 18 provide positive stops preventing accidental removal of the pin.

With the post thus preliminarily adjusted in position under the floor to be supported, the screw shaft 23 is turned with respect to nut 21, by means of a suitable bar inserted through bore 24 of the shaft, thereby to further extend the post with powerful screw action until the floor is fully supported in desired level condition. When the post is thus positioned, with heavy load-supporting pressure applied to diametrically opposite end portions of the pin 14 at opposing contacting points 26, 26 and 27, 27 on the element 10 and member 11, respectively, the steel pin will be yieldingly, slightly deformed out of round and thereby bind the threaded connections thereof with the screws 17, to the extent that the screws may not be manually turned and removed. In other words, the pin 14 not only has been provided with safety means for preventing accidental removal of the same during or after the final longitudinal adjustment of the post, but also the pin is self-operating under load stress applied to the post to prevent tampering with the safety means which might result in either intentional or inadvertent removal of the screws 17.

Figure 3 shows a modified form of supporting pin 30 and safety means therefor for use in connection with a telescopic post substantially like the post previously described. The pin 30 is a hollow steel tube, internally threaded at opposite ends, as before, to receive a slotted-head screw 31 in one end, and a manually operable screw 32 in the other end. That is, the screw 32 has a head 33 provided with a relatively short handle extension 34 by which the screw may be turned by hand when the post is not under load stress. When the post is in position supporting a floor, however, the aforementioned slight deformation at the ends of the pin resulting in binding of the threads of the pin and the screws will prevent such manual turning and removal of screw 30, even by means of handle 34. For the purpose of use of the pin as described the same may be received through aligned holes 35, 35 below or outwardly of the upper end of member 11, and through selected aligned apertures 12, 12 in the element 10. The post structure of Figure 3 is otherwise constructed and operated substantially the same as the post of Figures 1 and 2, except that the handled screw 32 makes the modified form of post more suitable for temporary use of the same, such as for shoring excavations and supporting other temporary structures. In other words, the post is collapsible when the longitudinal load stress is removed therefrom, through reverse operation of the screw device at the top, thereby to cause the pin to resume normal round shape and relieve binding action on the screws, after which the screw 32 may be removed from the pin by turning handle 34. When screw 34 is removed the pin 30 is easily removable from the post.

Both forms of the improved load-supporting pin are safe to operate and to use, and yet because the hollow structure of the pin saves material, without sacrificing shearing strength where vitally needed, the post may be economically manufactured.

Other modifications of the invention may be resorted to without departing from the spirit thereof or the scope of the appended claims. As an example, the screws 17 shown in Figures 1 and 2 may be of the drive-in threaded type, in which case no threads would be required in the ends of the tubular pin 14.

What is claimed is:

1. An adjustable post of the character described, comprising a longitudinally extensible unit including a tubular member and a cylindrical element telescopically arranged within the same to have a portion of the element extending longitudinally outwardly of one end of the member, said member having aligned bearing portions provided in diametrically opposite wall portions thereof, said element having at least one opening therethrough, and a pin received through said opening in said element and supported on said bearing portions of said member, said pin having stop means on opposite ends thereof providing enlargements engageable with the tubular member to prevent axial movement of the pin, at least one said stop means including a screw coaxially threaded into the end of said pin to a substantial load-supporting extent radially inwardly of the outer periphery of said cylindrical element, said pin being of resilient metal and sufficiently thin-walled at the threaded end thereof to be resiliently distorted under load stress on the post, thereby frictionally to bind the threads of the pin and screw and to prevent manual removal of the screw.

2. An adjustable post of the character described, comprising a longitudinally extensible unit including a tubular member having longitudinally inwardly presented supporting edge portions and a tubular element telescopically arranged within the said tubular member to have a portion of the element extending longitudinally outwardly of one end of the member, said element having at least one opening therethrough, a pin received through said opening in said element and engageable with said supporting edge portions of said member, said pin having stop means on opposite ends thereof providing enlargements engageable with the tubular member to prevent axial movement of the pin, at least one said stop means including a screw coaxially threaded into the end of said pin to a substantial load-supporting extent radially inwardly of the outer periphery of said cylindrical element, said pin being of resilient metal and sufficiently thin-walled at the threaded end thereof to be resiliently distorted under load stress on the post, thereby frictionally to bind the threads of the pin and screw and to prevent manual removal of the screw, said screw enlargement having a handle extension thereon manually operable to turn the screw with reference to the pin upon said load stress being relieved.

3. An adjustable post of the character described, comprising a longitudinally extensible unit including a tubular member and a tubular element telescopically arranged within the same to have a portion of the element extending longitudinally outwardly of one end of the member, said tubular member having opposite wall portions, means in said wall portions inwardly of said end providing aligned bearing surfaces, said element having aligned apertures in opposite wall portions thereof, a tubular load-supporting pin received through said aligned apertures in the element and having outer ends adapted to be supported on said aligned bearing surfaces, and screws threaded in opposite ends of said tubular pin and having heads thereon engageable with opposite sides of the member to limit axial shifting of the pin, the inner ends of said screws extending at least substantially to the inner surface of said element and thereby providing solid bearing support from said member to said element through the pin, said pin being of resilient metal and sufficiently thin-walled at the threaded ends thereof to be resiliently distorted out of round under load stress on the post, thereby frictionally to bind the threads of the pin and screws and to prevent manual removal of the screws.

References Cited in the file of this patent
UNITED STATES PATENTS

| | | |
|---|---|---|
| 1,381,663 | Roeder | June 14, 1921 |
| 1,457,182 | Mallory et al. | May 29, 1923 |
| 1,606,025 | Gruendler | Nov. 9, 1926 |